United States Patent [19]

Hanson, Sr.

[11] 4,192,898
[45] Mar. 11, 1980

[54] STABLE CLEAR LIQUID RELEASE AGENT AND METHOD FOR PREPARATION

[75] Inventor: Harold W. Hanson, Sr., Los Angeles, Calif.

[73] Assignee: Par-Way Mfg Co., Los Angeles, Calif.

[21] Appl. No.: 916,116

[22] Filed: Jun. 16, 1978

Related U.S. Application Data

[63] Continuation-in-part of Ser. No. 532,850, Dec. 16, 1974, abandoned, and a continuation of Ser. No. 621,309, Oct. 10, 1975, abandoned, and a continuation-in-part of Ser. No. 772,929, Feb. 28, 1977, Pat. No. 4,096,258.

[51] Int. Cl.$^2$ ............................................. A23D 5/00
[52] U.S. Cl. .................................... 426/250; 426/609
[58] Field of Search ............... 426/601, 607, 609, 610, 426/612, 417, 811, 250

[56] References Cited
U.S. PATENT DOCUMENTS

| | | | |
|---|---|---|---|
| 2,559,481 | 7/1951 | Truesdell | 426/609 |
| 2,963,372 | 12/1960 | Brody et al. | 426/609 |
| 3,011,896 | 12/1961 | Eber et al. | 426/606 |
| 3,415,658 | 12/1968 | Cunningham et al. | 426/610 X |
| 3,437,492 | 4/1969 | Lensack | 426/612 |
| 3,849,580 | 11/1974 | Sejpal et al. | 426/609 X |

Primary Examiner—Robert A. Yoncoskie

[57] ABSTRACT

A method and composition for preparing a stable clear liquid release agent comprising at least two oils of an animal or vegetable fat and from about 0.25 to 2.0 percent by weight polysorbate 80 in which the oil present in a major portion is a liquid at room temperature and the oil present in a minor portion is a solid at room temperature. The method comprises forming a uniform mixture by agitating the oils at a temperature on the order of 74° C. followed by rapidly and uniformly chilling the mixture with agitation to at least about 25° C. and working the chilled mixture. Preferably the mixture is pre-cooled and homogenized prior to the rapid chilling step. Further, after the rapid chilling step the resultant blend is packed with $CO_2$ propellant to yield an environmentally safe aerosol product. The resultant blend of oils presents a brighter and clearer appearance and is less susceptible to separation than conventionally blended oil mixtures.

14 Claims, No Drawings

STABLE CLEAR LIQUID RELEASE AGENT AND METHOD FOR PREPARATION

CROSS REFERENCE TO RELATED APPLICATION

The present application is a Continuation-in-Part of U.S. application Ser. No. 532,850, filed Dec. 16, 1974, for Method for Processing Animal and Vegetable Oils, and is a continuation of U.S. application Ser. No. 621,309 filed Oct. 10, 1975, both of which are now abandoned, and a continuation-in-part of U.S. application Ser. No. 772,929, filed Feb. 28, 1977 for Method for Preparing a Stable Clear Liquid Release Agent now U.S. Pat. No. 4,096,258.

BACKGROUND OF THE INVENTION

The present invention relates to the processing of animal and vegetable oils and more particularly relates to a new and improved composition and a method for blending mixtures of oils to form a stable clear liquid release agent.

Mixtures of animal and vegetable oils are widely used in numerous products such as salad oils, cooking and baking oils, release coatings for baking and cooking pans and the like. Such oil mixtures, which may include additives to prevent spattering during cooking, emulsifiers, colorants and flavorants are normally prepared by blending the ingredients at an elevated temperature and packaging or storing the hot blend directly from the blending operation, in a container. The blended oil mixture is then allowed to cool slowly to ambient temperature in the container.

In accordance with the conventional prior art methods of blending animal and vegetable oils, the cooling of the blended oils occurs unevenly with the greatest rate of cooling occurring at the interface of the container and oil while the center portion of the oil cools most slowly. Thus, any tendency for the components to separate will occur during the slow cooling period in the container and even in the case where gross separation of components does not occur, resultant finished products may tend to be slightly dull in appearance.

In view of the fact that blended oils are normally examined for clarity and brightness by customers, either during quality control test when sold in bulk or by viewing in clear transparent containers at the retail level, any tendency towards lack of brightness or separation of the blended components in the finished product is highly undesirable.

Additionally, some prior blended oils for instance, used as food release pan coatings have generally been formed of a water in oil emulsion packed with hydrocarbon propellants, such as butane gas. In this regard, butane gas or other flammable propellant is disadvantageous in that its use presents an explosion hazard and relatively limited shelf life for the resultant packed water in oil emulsion product. This limited shelf life is caused by a relatively high absorption of butane gas in the emulsion as well as health hazards that have been expereince due to bacterial growth (salmonilla) associated with water in oil blends.

Hence, those concerned with the development and use of release agents have recognized a significant need for an effective packaged release agent which is a stable, clear liquid and which is environmentally safe. The present invention fulfills this need.

SUMMARY OF THE INVENTION

Briefly, and in general terms, the present invention provides a new and improved stable clear liquid release agent packed with $CO_2$ propellant and a method for preparing the same.

In accordance with the present invention blends comprised of at least two animal or vegetable oils in which the oil present in a major portion is a liquid at room temperature and the oil present in a minor portion is a solid at room temperature and from about 0.25 to 2.0 percent by weight polysorbate 80 are subjected to a chilling step after high temperature blending and prior to packaging with a $CO_2$ propellant to uniformly bring the blend temperature to at least 25° C. More particularly, polysorbate 80 is added to the oil blend prior to chilling but after the oil blend has cooled slightly, for example a temperature of between about 74° C. to 85° C., from its initial high temperature blending. Following chilling, the blend is worked by agitation to produce a thoroughly mixed, uniform finished release agent. The finished stable clear liquid release agent is brighter in appearance than conventionally blended oils thereby presenting a superior, more marketable appearance and ensuring non-separation of the components of the blend which may occur due to slow cooling of the oil blend from the blend temperature.

Moreover, it has been found that oils prepared as release agents in accordance with the invention have better releasing properties than oils of the same composition but prepared without the chilling and agitating step. In addition it is unnecessary to compensate for volume changes when packaging oils blended in accordance with the present invention since the product is at room temperature prior to packaging with $CO_2$ propellant.

Perhaps more importantly, the aforementioned problems relating to explosion hazards with hydrocarbon propellants and health hazards associated with bacterial growth in water in oil emulsions are completely obviated.

These and other advantages and features of the present invention will be apparent from the following detailed description of the invention and the claims appended thereto.

DESCRIPTION OF THE PREFERRED EMBODIMENT

The present invention resides in a new and improved release agent composition and process for blending mixtures of animal and vegetable oils so as to ensure a desirable final product, particularly in its brightness or clarity and its effectiveness as a release agent. It has been found that oil mixtures treated in accordance with the invention have a reduced tendency for the components to separate thereby resulting in a brighter, clearer and more effective product than achieved by the same blend of oils processed by conventional methods. Further, it is believed that even with highly miscible ingredients, temperature differentials within the blending will result in separation of ingredients which will detract from the appearance and effectiveness of the product.

In accordance with the present invention, the oil blends treated comprise at least two oils of an animal or vegetable fat in which the oil present in a major portion is a liquid at room temperature and the oil present in a minor portion is a solid at room temperature, and from about 0.25 to 2.0 percent by weight polysorbate 80.

In more detail, the fatty oil which is normally liquid at room temperature comprises from about 58 to 84 percent by weight of the blend and the fatty oil which is normally solid at room temperature comprises from about 15 to 41 percent by weight of the blend with the remainder being polysorbate 80 and other additives. Such oil blends are primarily utilized as release agents for cooking and baking utensils and the like.

The fatty oils processed by the invention are fatty acid glycerides of medium and high unsaturation such as for example: oleiclinoleic acid oils such as palm oil, olive oil, cottonseed oil, peanut oil, sunflower seed oil, corn oil, sesame oil; erucic acid oils, such as rapeseed oil, and mustard seed oil; lauric acid oils such as coconut oil and palm-kernel oil; linolenic acid oils such as soybean oil and marine oils such as herring, menhaden, pilchard and fish liver oils.

Of the aforementioned oils, palm oil, coconut oil and palm kernel oil are normally solids between about 20° C. and about 25° C. (room temperature). In particular, it has been determined that coconut oil, palm oil and palm kernel oil have a melting point of between about 20° C. to 25° C. (69.8° F. to 77° F.). While these solid oils have excellent release properties in and of themselves, they suffer from the disadvantage that they smoke at relatively low temperatures. Therefore, it has been found in order to prepare an effective release agent, it is desirable to utilize a combination of one or more solid oils and a second oil which is normally a liquid oil at room temperature having a higher smoke point.

The term "Oil blends" as used herein, however, is to be distinguished from the liquid suspensions, semi-solid, plastic, or solid fats which are conventionally termed as butters, fats, shortenings or tallows, which present somewhat different problems in processing.

Preferably, the release agents of the present invention will be tailor blended to suit a particular use, and the amounts of solid oils and other oils present in the release agent composition will depend upon the ultimate use for the release agent. A different composition would be used in a release agent for bakery items, as opposed to a release agent for candy or the like.

Thus, by blending an oil which is normally solid at room temperature with an oil which is normally liquid at room temperature in the following described manner, a clear stable release agent will be obtained in which the solid oil component will not separate out. Accordingly, one important feature of the present invention is that it provides an oil blended release agent having superior properties with respect to lack of smoking at higher temperatures and which will be stable over longer periods of time as compared to conventionally blended oil compositions.

It should be noted that fatty oils useful in the present invention may be prepared synthetically and need not be derived solely from natural sources. Accordingly, as used herein, the term "fatty oils" and "animal and vegetable oils" is intended to cover fatty acid glycerides which are liquid at room temperature and which are normally derived from natural sources but which may also be synthetically prepared.

In addition to a major proportion of fatty oils as previously described herein, the oil blends will include from about 0.25 to 2.0 percent by weight polysorbate 80 for viscosity reduction and are packaged with about 3.0 to 5.0% by weight $CO_2$ propellant under a pressure of from about 95 to 115 psig for a typical 8.0 av. ounce spray can. Further, the blends may optionally include minor proportions of fat soluble additives designed to provide or promote desirable properties in the finished fatty oil blend. For example, anti-oxidants such as the tocophenols may be added to prevent rancidity. Emulsifying agents, agents for the prevention of bleeding and spattering, coloring agents, flavoring agents and the like may also be incorporated in minor proportions in the oil blend. A highly useful additive is soybean oil lecithin which serves as an anti-bleeding and spattering agent and emulsifying agent. Another highly useful additive is aluminum stearate which serves to improve the release properties of the oil blend when added in an amount of from about 1 to 10% by weight to the total blend.

In accordance with the present invention the chosen fatty oils and additives are blended together at temperatures well above room temperature. However, the polysorbate 80 component is added to the mixture after high temperature blending but while the mixture is still warm, e.g. from about 74° C. to 85° C. The high temperature blending step may be performed at temperatures of between 65° C. to about 260° C. depending upon the nature of the fatty oils and additives. Preferably the blending temperature is maintained as low as possible to reduce the expense of heating and to avoid any thermal degradation of the blend ingredients. The purpose of forming the blend at elevated temperatures is to reduce the viscosity of the fatty oils thereby to lower power requirements for the mixing and to aid in forming a substantially uniform mixture.

Further in accordance with the present invention, the heated oil blend including the minor amount of polysorbate 80 is subjected to a chilling step to uniformly reduce the temperature of the oil blend to a temperaure of between about 25° C. and 20° C. Preferably the chilling step is preceded by at least one precooling step to reduce the blend temperature to about 60° C.

The precooling step need not be rapid and as will be seen in the following Examples can be carried out simply by pumping the fatty oil blend through the blending system until the temperature has been reduced to the desired level. There is little danger of the formation of cloud in the blend during precooling since the blend is constantly agitated by the pumping action and cooling is substantially uniform, if not rapid.

The chilling step is carried out under conditions which will effect the uniform cooling of the blended oil product to a temperature of between about 25° C. and 20° C. Accordingly, the oil blend is chilled in a suitable heat exchanger through which a conventional coolant, such as water or silicone fluid, is circulated. Uniform chilling is achieved by mixing or agitating the oil blend to avoid the formation of undesirable temperature gradients in the blend. Preferably the oil blend is chilled as rapidly as is permitted by the equipment utilized. However, uniformity of chilling is of greater importance than the rate of chilling.

A preferred heat exchanger for the chilling step is a device commonly marketed by the Girdler Corporation under the trademark "Votator". This device comprises a jacketed tube having disposed therein a rotatable shaft with outwardly extending scrapers or wipers, the tips of which contact the wall of the tube bore. The shaft diameter is about three quarters of the tube diameter so that a relatively confined annular space is defined between the shaft and the tube. During operation the blend is pumped through the annular space while the shaft is rotating at high speed. While passing through the annular space, the blend is forced into a relatively thin layer which results in substantial uniform and rapid heat loss. The wipers constantly agitate the blend and wipe films of the blend from the wall of the tube bore. Coolant is pumped through the tube jacket to remove heat from the blend passing throught the tube bore resulting in a rapid and uniform heat transfer from the fatty oil blend.

Although the "Votator" represents the preferred means for chilling the fatty oil blend, it should be clear that other types of heat exchange mixers are used to chill the fatty oil blend. For example, propeller mixers, colloid mills, homogenizers, turbomixers and the like may be utilized so long as the mixing vessel is adapted for cooling the fatty oil blend contained therein to about 25° C. It is preferred that the mixing apparatus be of the continuous type as contrasted to batch type and for this additional reason the "Votator" is highly preferred.

Following the chilling step, the oil blend is subjected to a working step at its chilled temperature. The working step is accomplished by agitating the now chilled oil blend to thoroughly mix the oil blend to produce the finished product. Without the final working operation, the separate batches or increments of chilled oil blend tend to be somewhat segregated and uniformity of appearance and effectiveness of the final product is adversely affected.

Although not essential, it is preferred to subject the fatty oil blend to a homogenization step prior to the final chilling operation. If the blend is precooled, homogenization is advantageously carried out between the precooling and chilling steps. Conventional homogenizing equipment is employed in the homogenization step.

The following examples illustrate the manner which a fatty oil blend is prepared in accordance with the invention. Although the examples describe specific fatty oil blends and specific processing temperatures, the invention is not to be construed as being limited to the particular embodiments set forth therein.

EXAMPLE 1

A fatty oil blend for use as a release agent for baking utensils was prepared in accordance with the following formula.

| | |
|---|---|
| [1]Refined Soybean Oil | 2675 lbs. |
| [2]Coconut Oil | 1784 lbs. |
| Lecithin, double bleached | 240 lbs. |
| Polysorbate 80 | 36.9 lbs. |
| BEX Butter Derivative | 2.4 lbs. |
| Beta-Carotene | 3.8 oz. |

[1]Free Fatty Acid Content-0.04%
[2]Free Fatty Acid Content-0.05% max.
[2]Iodine value-60 to 110
[2]Moisture-.05% max.

Approximately 50 weight % of the soybean oil and coconut oil were metered into a blending tank provided with an electrically driven impeller for mixing the oils. Immersion heaters were disposed in the blending tank and were activated to heat the oil contained in the tank. During heating the oil was mixed by the impeller. Heating was continued until the oil temperature reached about 70° C., at which point the immersion heaters were turned off.

The lecithin was introduced into the heated oil and mixed for about 10 minutes. The balance of coconut and soybean oil was then charged to the blending tank followed immediately by the Polysorbate 80, the butter derivative and the beta-carotene. Mixing of the entire batch was continued for about 3 minutes. After mixing, the batch temperature had dropped to about 66° C. A 55 gallon sample was removed, homogenized in a 2-stage homogenizer in the manner described hereinafter and placed in a 55 gallon drum and stored while still warm in accordance with conventional practice.

Following mixing, the remaining oil mixture was precooled by circulating the mixture between the blending tank and a pre-cooler consisting of heat exchange coils immersed in cold water until the temperature of the material had dropped to about 60° C. Approximately 10 minutes was required for precooling.

The precooled blend was then passed through a 2-stage homogenizer with the first stage set at 1000 psi and the second stage at 3500 psi and returned to the pre-cooler where the temperature of the homogenized blend was reduced to about 38° C.

From the pre-cooler, the blend was pumped through the "Votator" where the blend was agitated and rapidly chilled from about 38° C. to about 21° C. After chilling, the oil blend was introduced into a high speed paddle agitator (Girdler Co. B Unit) and worked at high speed agitation to whip and thoroughly mix the oil blend. Following working, the oil blend was packaged in 55 gallon drums.

After the 55 gallon sample, which had been packaged while still hot, had cooled to room temperature, a smaller sample was removed from the drum and placed in a clear, transparent container and visually compared to similar samples removed from the drums containing chilled product. The samples of chilled product were clear and brilliant and presented a brighter appearance than the conventionally processed product which was clear but which, in comparison to the chilled product, was not as brilliant.

The release properties of both the oil blend prepared by conventional practice and the blend prepared according to the invention are checked by coating muffin pans with a release coating of each of the oil blends and baking muffins in the pans at 400° C. At completion of baking, the pans are inverted. With muffin pans coated with the blend prepared in accordance with the invention, that is with chilling and working, all the muffins are released and fall out of the pan. With pans using the oil blend prepared in the conventional manner, as many as one half of the muffins remain in the pan when it is inverted indicating that the conventionally processed oil blend is not as effective a release agent as the oil blend of the same composition but processed according to the invention.

The following are further examples of the invention:

EXAMPLE 2

The blending procedure of EXAMPLE 1 is utilized to prepare a fatty oil blend in accordance with the following formula:

| | |
|---|---|
| Corn Oil | 58% by weight |
| Palm Oil | 40% by weight |
| Polysorbate 80 | 2% by weight |

This oil blend is then packaged with carbondioxide propellant in an amount of about 3.5% by weight of the total blend. Metal cans having a fill capacity of about 8.2 ounces and having a welded side seam are suitable for packaging the blend at about 70° F. having a pressure of about 112 PSIG with a Newman green (R-70-188) valve to deliver approximately 1.23 grams second spray.

EXAMPLE 3

The blending procedure of EXAMPLE 1 is repeated for preparing a fatty oil blend in accordance with the following:

| Peanut Oil | 78% by weight |
| Palm Kernel Oil | 15% by weight |
| Lecithin, double bleached | 5% by weight |
| Polysorbate 80 | 2% by weight |

This oil blend is again packaged in accordance with EXAMPLE 2 above.

EXAMPLE 4

The blending procedure of EXAMPLE 1 is repeated for preparing a fatty oil blend in accordance with the following:

| Cotton seed oil | 75% by weight |
| Palm oil | 20% by weight |
| Lecithin | 4% by weight |
| Polysorbate 80 | 1% by weight |

This oil blend is again packaged in accordance with EXAMPLE 2 above.

The above Examples utilize a precooling step prior to the chilling step, however, good results are achieved when the precooling step is eliminated. In such a case the oil blend is homogenized after blending without any deliberate cooling. The homogenized blend is circulated through the "Votator" until the temperature is reduced to at least about 25° C. It has been found that a given quantity of oil blend will require 2 or more passes before the temperature is reduced to the desired level but it should be noted that the temperature drop obtained with each pass is rapid and the blend is uniformly chilled even where several passes are necessary. Where batch type coolers are utilized without precooling the blend, chilling is accomplished by increasing the holding time in the cooler until the blend temperature is reduced to the desired level of between about 25° C. and 20° C.

From the foregoing it will be seen that forming an oil blend utilizing uniform chilling and working the blend after chilling produces a final product having improved brilliance and release properties as contrasted to blends of the same composition but prepared in the conventional manner. While the process has been illustrated in connection with a preferred embodiment it should be clear that modifications of the process can be made without departing from the spirit or scope of the invention as defined in the appended claims.

I claim:

1. A method for preparing a stable clear liquid release agent comprising a uniform liquid blend of fatty oils and Polysorbate 80, the method comprising the steps of heating and blending at a temperature of between about 65° C. and about 260° C. at least two fatty oils, said oils including a first oil selected from a group consisting of palm oil, coconut oil and palm kernel oil and mixtures thereof, said first oil being present in an amount of from about 15 to about 41 percent by weight of said blend, and a second oil selected from the group consisting of olive oil, cottonseed oil, peanut oil, sunflower seed oil, corn oil, herring oil, manhaden oil, pilchard oil, and fish liver oil and mixtures thereof, said second oil being present in an amount of from about 58 to about 84 percent by weight of said blend; further blending Polysorbate 80 at a temperature of between about 74° C. and 85° C. with said blend of first and second oils said Polysorbate 80 being present in an amount of from about 0.25 to about 2.0 percent by weight of said blend; chilling said blend of the first and second oils and said Polysorbate 80 to uniformly cool said blend to a temperature of between about 20° C. and about 25° C., working said chilled blend by high speed agitation to provide a clear liquid release agent and packaging said release agent with a $CO_2$ propellant in an amount of from about 3.0 to about 5.0 percent by weight of said blend.

2. The method of claim 1 wherein said fatty oils are heated to a temperature of about 70° C. during said blending step.

3. The method of claim 2 further including the steps of cooling said blend to an intermediate temperature of about 60° C. and homogenizing said blend prior to the chilling step.

4. An improved release agent comprising the fatty oil blend produced by the method of claim 3.

5. The method of claim 1 wherein said blend is chilled by passing said blend through an annular space defined between the bore of the jacketed tube and a rotating shaft with outwardly extending scrapers, the tips of which contact the wall of said bore for removing films of blended oil from the wall of said bore, said jacketed tube being cooled for the removal of heat from said blend which is formed by said annular space into a relatively thin layer for the substantially uniform removal of heat from said layer of said mixture.

6. The method of claim 1 wherein said oil blend further includes an effective amount of a flavor additive and a colorant.

7. The method of claim 1 further including the steps of cooling said blend to a temperature of about 60° C. prior to said chilling step.

8. The method of claim 1 further including the step of homogenizing said blend prior to said chilling step.

9. An improved release agent comprising the fatty oil blend produced by the method of claim 1.

10. The method defined in claim 1, wherein said liquid blend of oils further includes an amount of lecithin sufficient to act as an anti-spattering, anti-bleeding and emulsifying agent.

11. An improved release agent comprising the fatty oil blend produced by the method of claim 10.

12. The method defined in claim 1, wherein said blend further includes an effective amount of anti-oxidants.

13. The method defined in claim 1 wherein said blend further includes aluminum stearate in an amount from about 1 to about 10 percent by weight of the blend.

14. An improved release agent comprising the fatty oil blend produced by the method of claim 13.

* * * * *

UNITED STATES PATENT AND TRADEMARK OFFICE
CERTIFICATE OF CORRECTION

PATENT NO. : 4,192,898

DATED : 3/11/80

INVENTOR(S) : Harold W. Hanson (Sr.)

It is certified that error appears in the above-identified patent and that said Letters Patent are hereby corrected as shown below:

Col. 1, line 62 "expereince" should read -- experience --.

Col. 3, line 17 "palm-kernel" should read -- palm kernel --.

Col. 5, line 7 "throught" should read -- through --.

Col. 6, line 20 "a gitated" should read -- agitated --.

Signed and Sealed this

Fifth Day of August 1980

[SEAL]

Attest:

SIDNEY A. DIAMOND

Attesting Officer

Commissioner of Patents and Trademarks